United States Patent
Nolan et al.

(10) Patent No.: US 8,965,217 B2
(45) Date of Patent: Feb. 24, 2015

(54) SUPERIMPOSING OPTICAL TRANSMISSION MODES

(71) Applicant: Corning Incorporated, Corning, NY (US)

(72) Inventors: Daniel A. Nolan, Corning, NY (US); Giovanni Milione, Franklin Square, NY (US); Robert R. Alfano, Bronx, NY (US)

(73) Assignees: Corning Incorporated, Corning, NY (US); The Research Foundation of CUNY of behalf of the City College of New York, New York, NY (US)

( * ) Notice: Subject to any disclaimer, the term of this patent is extended or adjusted under 35 U.S.C. 154(b) by 69 days.

(21) Appl. No.: 13/803,872

(22) Filed: Mar. 14, 2013

(65) Prior Publication Data

US 2014/0161439 A1    Jun. 12, 2014

Related U.S. Application Data

(60) Provisional application No. 61/735,477, filed on Dec. 10, 2012, provisional application No. 61/760,040, filed on Feb. 2, 2013.

(51) Int. Cl.
*H04B 10/12* (2006.01)
*H04B 10/2569* (2013.01)
(Continued)

(52) U.S. Cl.
CPC ........ *H04B 10/2569* (2013.01); *H04B 10/2581* (2013.01); *H04J 14/04* (2013.01); *H04B 10/0795* (2013.01); *H04B 10/0799* (2013.01)
USPC .......... 398/143; 398/141; 398/142; 398/183; 398/195; 398/25

(58) Field of Classification Search
USPC ............................ 398/141–143, 25, 183, 195
See application file for complete search history.

(56) References Cited

U.S. PATENT DOCUMENTS 8,417,124 B2 * 4/2013 Ford ............................. 398/143
8,538,275 B2 * 9/2013 Essiambre et al. ............ 398/201
(Continued)

FOREIGN PATENT DOCUMENTS

EP    2437089    * 4/2012    ............... G02B 6/32

OTHER PUBLICATIONS

Antonelli et al; "Modeling of Linear and Nonlinear Coupling in Multiple-Mode Fiber Optic Transmission With MIMO Signal Processing"; IEEE; Asilomar 2012; pp. 645-649, Nov. 2012.
(Continued)

*Primary Examiner* — Li Liu
(74) *Attorney, Agent, or Firm* — Gregory V. Bean

(57) ABSTRACT

A method of superimposing N optical transmission modes for collective transmission along a multimode optical fiber is provided where each of the N optical signals comprises N distinct superimposed transmission modes (M1, M2, ...) and a portion of each of the N propagating optical signals is sampled at a receiving end of the data transmission network. $N^2-1$ distinct measurement conditions are derived from a transmission matrix T and a special unitary matrix group SU(N) corresponding to the superimposed transmission modes (M1, M2, ...) at the receiving end of the data transmission network and $N^2-1$ measurements are extracted from the sampled signals. The extracted $N^2-1$ measurements are used to solve a matrix equation corresponding to the generated SU(N) matrices and the output matrix transposed and used to generating principal state launch conditions from the eigenvectors of the transposed output matrix to form a principal state in each of the N optical signals.

18 Claims, 2 Drawing Sheets

(51) Int. Cl.
*H04B 10/2581* (2013.01)
*H04J 14/04* (2006.01)
*H04B 10/079* (2013.01)

(56) References Cited

U.S. PATENT DOCUMENTS

| | | | | |
|---|---|---|---|---|
| 8,822,905 | B2* | 9/2014 | Ryf | 250/227.11 |
| 2012/0008961 | A1* | 1/2012 | Chen et al. | 398/119 |
| 2012/0163801 | A1* | 6/2012 | Takenaga et al. | 398/16 |
| 2012/0224807 | A1* | 9/2012 | Winzer et al. | 385/28 |
| 2012/0224861 | A1* | 9/2012 | Winzer et al. | 398/143 |
| 2012/0319885 | A1* | 12/2012 | Chang | 341/155 |
| 2014/0126915 | A1* | 5/2014 | Gruner-Nielsen et al. | 398/143 |
| 2014/0286648 | A1* | 9/2014 | Buelow | 398/143 |

OTHER PUBLICATIONS

PCT/US2013/073788 Search Report, Mar. 2014.
Fan et al., "Principal modes in multimode waveguides", Optics Letters, vol. 30, No. 2 pp. 135-137, Jan. 15, 2005.
Fridman et al, "Modal dynamics in multimode fibers", Optical Society of America, vol. 29, No. 4, pp. 541-544, Apr. 2012.
Gordon et al., "PMD fundamentals: Polarization mode dispersion in optical fibers", PNAS, vol. 97, No. 9, pp. 4541-4550, Apr. 25, 2000.
Han et al., "Coherent optical communication using polarization multiple-input-multiple-output", Optics Express, vol. 13, No. 19, pp. 7527-7534, Sep. 19, 2005.
Juarez et al., "Perspectives of principal mode transmission in mode-division-multiplex operation", Optics Express, vol. 20, No. 13, pp. 13810-13823, Jun. 18, 2012.
Kalaidji et al., "Radially Polarized Conical Beam from an Embedded Etched Fiber", Optics Letters, vol. 34, No. 12, pp. 1780-1782, Aug. 2009.
Ryf et al., "Mode-Division Multiplexing Over 96 km of Few-Mode Fiber Using Coherent 6x6 MIMO Processing", Journal of Lightwave Technology, vol. 30, No. 4, pp. 521-531, Feb. 15, 2012.
Shah et al., "Coherent Optical MIMO (COMIMO)", Journal of Lighwave Technology, vol. 23, No. 8, pp. 2410-2419, Aug. 2005.
Shemirani et al., "Principal Modes in Graded-Index Multimode Fiber in Presence of Spatial- and Polarization-Mode Coupling", Journal of Lightwave Technology, vol. 27, No. 10, pp. 1248-1261, May 15, 2009.
Shemirani et al., "Adaptive Compensation of Multimode Fiber Dispersion by Control of Launched Amplitude, Phase, Polarization", Journal of Lightwave Technology, vol. 28, No. 18, pp. 2627-2639, Sep. 15, 2010.
G. Milone et al., "Cylindrical vector beam generation from a multi elliptical core optical fiber", In proceeding of: Complex Light and Optical Forces V, vol. Proc. SPIE 7950, Feb. 2011.

* cited by examiner

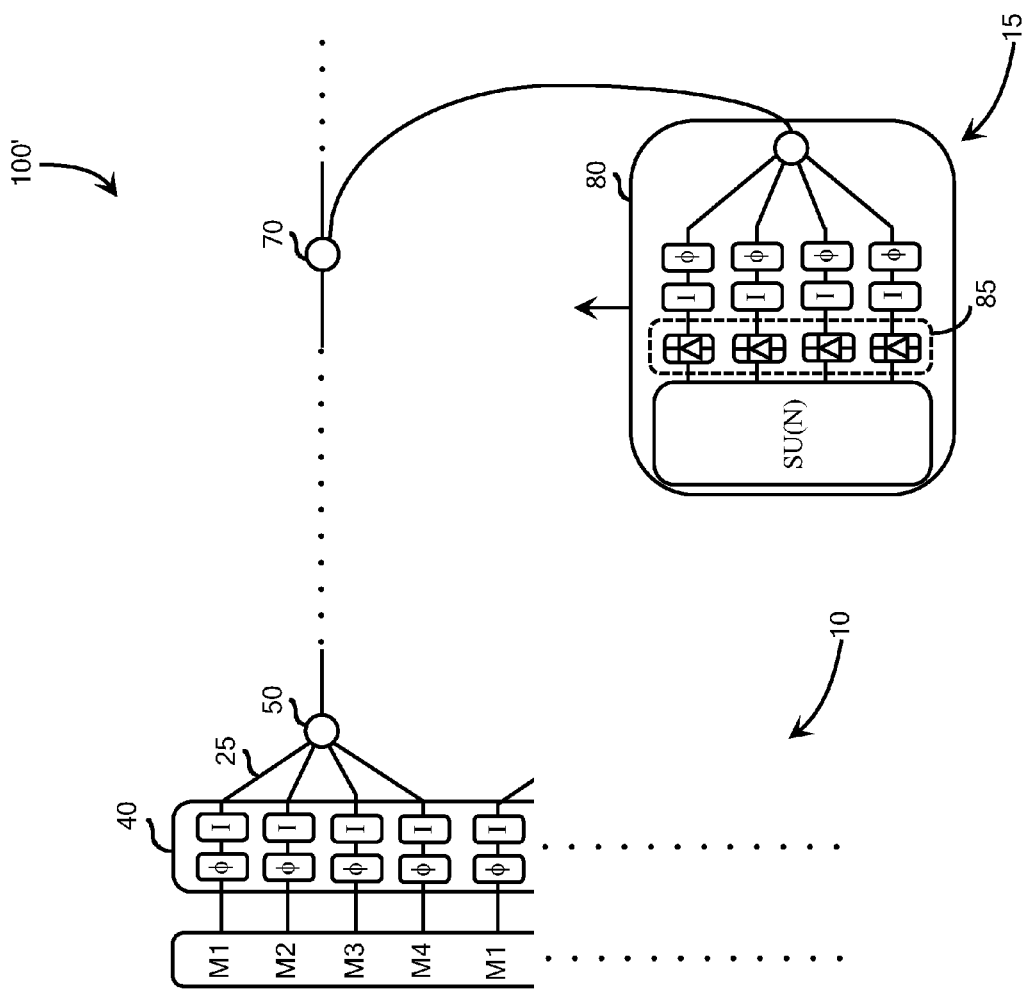

SUPERIMPOSING OPTICAL TRANSMISSION MODES

CROSS-REFERENCE TO RELATED APPLICATIONS

This application claims the benefit of U.S. Provisional Application Ser. Nos. 61/735,477 filed Dec. 10, 2012 and 61/760,040 filed Feb. 2, 2013.

BACKGROUND

1. Field

The general utility of single mode optical fiber is perceived as being limited in long haul and other applications because of its limited information capacity. Multimode fibers have been introduced to increase transmission capacity but these multi-channel fibers, which transmit multiple optical modes in a single core or multiple distinct cores, are subject to channel crosstalk due to mode coupling effects. For example, mode coupling in multimode fibers can arise when an optical fiber or fiber bundle is subject to bending or twisting in its deployed state.

2. Technical Background

Digital signal processing techniques have been developed to deal with channel crosstalk arising from the aforementioned mode coupling. One type of this digital signal processing is commonly referred to as coherent multiple-input, multiple-output (MIMO) digital signal processing (DSP). MIMO DSP has been proposed and demonstrated widely but is limited to significant extent because it has proven difficult to deploy in systems of substantial transmission length, where the necessary error correction schemes become progressively more complicated with increasing transmission length.

BRIEF SUMMARY

Polarization mode dispersion (PMD) can arise in the multimode optical fibers of a data transmission network because of the presence of birefringence in the fibers. This birefringence changes randomly along the fiber length and stems from asymmetries arising from fiber stress and fiber geometry. There are different manifestations of PMD. In the frequency domain, for a fixed input polarization, there may be a change in the frequency of the output polarization. In the time domain, a difference in the mean time delay of a pulse traversing the fiber may arise. The present inventors have recognized that such a difference is a function of the polarization of the input pulse and that these two phenomena, i.e., PMD and the polarization of the input pulse, are intimately connected.

According to the subject matter of the present disclosure, SU(N) group theory is used to develop a formalism to superimpose N spatial or polarization modes and form N orthogonal principal states in fiber. These principal states provide a means to overcome the detrimental effects of mode coupling that occur in optical communications links. As is explained in detail below, this principal state formalism reduces to the Jones matrix eigenanalysis when N=2. In particular embodiments, some or all of the four polarization modes of the LP11 spatial mode group are used to establish the principal states. The subject matter of the present disclosure also covers methods and system components for multiplexing and demultiplexing the modal components of a fiber link constructed in accordance with the concepts of the present disclosure.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 2 is a schematic illustration of the manner in which the three principal state system of FIG. 1 could be scaled up to an N principal state system according to the concepts of the present disclosure.

DETAILED DESCRIPTION

Figure 1:
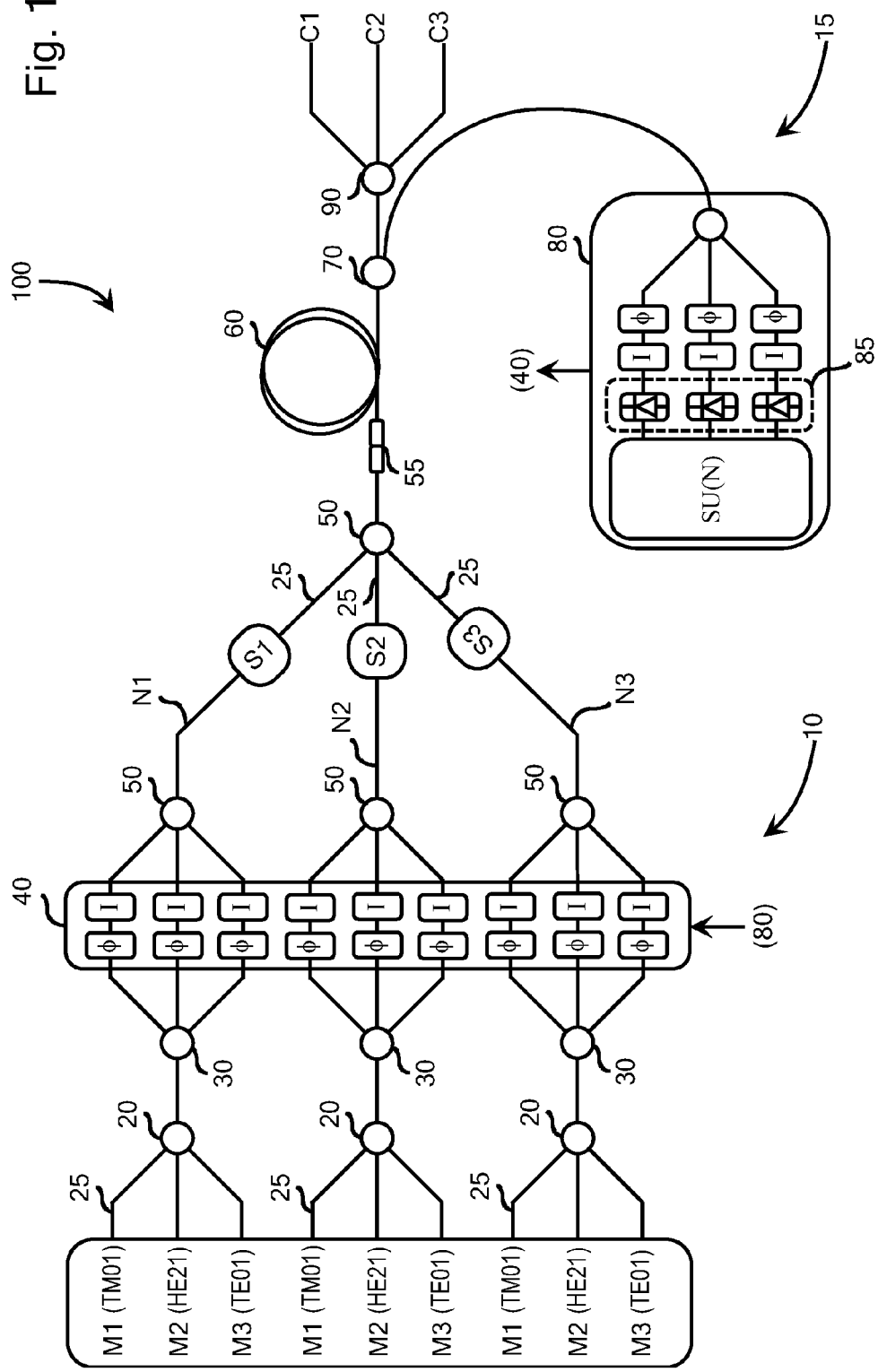
FIG. 1 is a schematic illustration of a three principal state system that may be implemented in accordance with the concepts of the present disclosure.

Polarization mode dispersion (PMD) can arise in the multimode optical fibers of a data transmission network because of the presence of birefringence in the fibers. This birefringence changes randomly along the fiber length and stems from asymmetries arising from fiber stress and fiber geometry. There are different manifestations of PMD. In the frequency domain, for a fixed input polarization, there may be a change in the frequency of the output polarization. In the time domain, a difference in the mean time delay of a pulse traversing the fiber may arise. Such a difference is a function of the polarization of the input pulse. These two phenomena are intimately connected.

More specifically, there exist special orthogonal pairs of polarization at the input and the output of the fiber, where the optical signal launched at the input end of the fiber does not change polarization at the output. These special orthogonal pairs of polarization are referred to herein as the principal states of polarization (PSPs). These PSPs have group delays which are the maximum and minimum mean time delays of the time domain view. The difference between these two delays is called the differential group delay (DGD).

FIG. 1 is a schematic illustration of a three principal state system that may be utilized as a data transmission network 100 in accordance with the concepts of the present disclosure. The concepts illustrated with reference to FIG. 1 can be extended to a transmission network 100' with four principal states, and then N principal states, in a relatively straightforward manner (see FIG. 2). Generally, in FIG. 1, at the launching portion 10 of the data transmission network 100, which may also be referred to as a data transmission link, respective sets of three transmission modes M1, M2, M3 are input onto the network 100 using mode multiplexers 20, such as an aspherical lens or lens array, and suitable optical waveguides 25. These sets of transmission modes M1, M2, M3, which may be spatial modes, polarization modes, or a combination thereof, are then split into three separate paths via mode splitter 30 where their respective phases and amplitudes can be controlled separately (see, e.g, phase/amplitude controller 40). The respective transmission modes M1, M2, M3 are then multiplexed using, e.g., active mode combiners 50, as respective optical signals N1, N2, N3. Subsequently, the optical signals N1, N2, N3 are combined using, e.g., an additional active mode combiner 50, for propagation along a multimode optical fiber 60 via a suitable fiber link 55.

At the receiving portion 15 of the data transmission network, a portion of each of the N propagating optical signals is sampled from the optical fiber 60 via, e.g., an optical tap 70, to enable determination of the principal states of polarization (PSPs) described herein. These states can be determined using the phase adjustment and the amplitude adjustment component of the launch controller 80 illustrated schematically in FIG. 1. Non-sampled optical transmission data is split via an active mode splitter 90 and routed to data receiving channels C1, C2, C3.

Referring to the schematic illustration of FIG. 1 for context, but not by way of limitation, according to contemplated methods of superimposing N optical transmission modes for collective transmission along a multimode optical fiber, while minimizing PMD, the optical signals N1, N2, N3 may be subject to direct or coherent optical modulation via suitable source modulators S1, S2, S3 in each of the channels carrying the optical signals N1, N2, N3. These N optical signals are launched onto the data transmission network, wherein each of the N optical signals comprises N distinct superimposed transmission modes (M1, M2, . . . ). A portion of each of the N propagating optical signals is sampled at a receiving end 15 of the data transmission network 100 and the N distinct superimposed transmission modes (M1, M2, . . . ) of the N propagating optical signals are split into N optical detection channels. In the illustrated embodiment, three optical detection channels 85 are illustrated within the architecture of the launch controller 80.

It is contemplated that the source modulators S1, S2, S3, which may be phase or amplitude modulators, can be configured for direct or coherent optical modulation. Similarly, it is contemplated that the optical detection channels 85 can be arranged for coherent or direct detection or demodulation of the modulated signals generated by the source modulators S1, S2, S3. In this manner, the data transmission network of the present disclosure may be utilized to implement a variety of encoding schemes including, for example, a coherent optical MIMO (multiple-input, multiple-output) system.

The launch controller 80 is programmed or otherwise configured to derive $N^2-1$ distinct measurement conditions from a transmission matrix T and a special unitary matrix group SU(N) corresponding to the superimposed transmission modes (M1, M2, . . . ) at the receiving end 15 of the data transmission network 100. These $N^2-1$ measurements, which are described in further detail below, are extracted from the sampled signals. Notably, the $N^2-1$ measurements correspond to the $N^2-1$ distinct measurement conditions. The extracted $N^2-1$ measurements are used to solve the matrix equation $$(T \cdot \Lambda)|V\rangle = \tau|V\rangle$$

where $\Lambda$ represents generated SU(N) matrices, $\tau$ represents the extracted measurements, and $|V\rangle$ represents principal state eigenvectors of an output matrix corresponding to the N propagating optical signals at the receiving end of the data transmission network 100. The resulting output matrix is transposed to permit the generation of principal state launch conditions from the eigenvectors of the transposed output matrix. The phase and amplitude of the N distinct superimposed transmission modes M1, M2, . . . of each of the N optical signals can be controlled in accordance with the principal state launch conditions to form a principal state in each of the N optical signals. In this manner, the principal states provide a means to overcome the detrimental effects of mode coupling that would otherwise arise in the data transmission network 100.

It is contemplated that the $N^2-1$ measurements, which typically comprise measurements of propagation delay differences among common transmission modes within selected ones of the N optical signals, can be extracted from the sampled signals on a periodic basis. Alternatively, it is contemplated that the $N^2-1$ measurements can be extracted from the sampled signals in response to a detected condition of the sampled signals including, for example, a particular PMD or noise threshold.

Although the transmission modes (M1, M2, . . . ) may comprise polarization modes, spatial modes, or a combination thereof, it will typically be preferable to ensure that the N distinct superimposed transmission modes (M1, M2, . . . ) within each of the N optical signals comprise a common set of transmission modes such that the polarization modes, spatial modes, or combination thereof, within any selected one of the N optical signals are identical to the transmission modes of the others. For example, where N=3, the N distinct superimposed transmission modes (M1, M2, . . . ) may comprise the TM01, TE01 and HE21 polarization modes, or the LP11, LP01, LP02 spatial modes, each of which are illustrated below. In cases where N≤8, the N distinct superimposed transmission modes (M1, M2, . . . ) may comprise N transmission modes selected from four available polarization modes of the LP11 spatial mode, two available polarization modes of the LP01 spatial mode, and two available polarization modes of the LP02 spatial mode. It is contemplated that the N distinct superimposed transmission modes (M1, M2, . . . ) may comprise polarization modes selected from the LP11 spatial mode. More specifically, where N=3, the polarization modes selected from the LP11 spatial mode may comprise, for example, the HE21, TM01, and TE01 polarization modes. These three modes are illustrated in FIG. 1 as one of the many possible sets of modes that may be selected in accordance with the concepts of the present disclosure. Where N=4, all four polarization modes can be selected from the LP11 spatial mode as the transmission modes (M1, M2, M3, M4). Sets of available spatial modes and polarization modes are illustrated in the following table:

| Spatial Modes | Polarization Modes |
|---|---|
| $LP_{01}$ | $HE_{11}$ |
| $LP_{11}$ | $HE_{21}$ |
|  | $TE_{01}$ |
|  | $TM_{01}$ |
| $LP_{21}$ | $HE_{31}$ |
|  | $EH_{11}$ |
| $LP_{02}$ | $HE_{12}$ |
| $LP_{31}$ | $HE_{41}$ |
|  | $EH_{21}$ |
| $LP_{12}$ | $HE_{22}$ |
|  | $TE_{02}$ |
|  | $TM_{02}$ |
| $LP_{1\mu}$ | $HE_{2\mu}$ |
|  | $TE_{0\mu}$ |
|  | $TM_{0\mu}$ |
| $LP_{\nu\mu} (\nu \neq 0, 1)$ | $HE_{\nu+1,\mu}$ |
|  | $EH_{\nu-1,\mu}$ |

There is significantly less coupling between the spatial mode groups in the table above, so a possibility is to form principal states within a modal group. Examples include two principal states within the LP01 modal group, four principal states within the LP11 modal group, two principal states within the LP02 modal group, and four principal states within the LP12 modal group. The polarization modes within the LP01 and the LP02 modes can be described well with the Poincare sphere, while those within the LP11 and LP12 modes can be described with the higher order Poincare sphere (Hops). In practice, it will often be better to use the TM01, TE01 and HE21 polarization modes for less dispersion. This is because the time delay between these modes is less than when using other modes, like the LP01, LP11 and LP02 modes.

Regarding the matrix equation set forth above, in the context of the case where N=3, the matrix elements given for the transformations between states are calculated with the eight measurements that are used to obtain 8 time delays. This matrix i is used to solve for the eigenvalues and eigenvectors for the three principal states. In analogy to the two fundamental polarization modes, where N=2, a matrix equation (eigenvalue, τ, and eigenvector, V) can be obtained for any value of N. This is expressed as the matrix equation above. For N=2, the matrix generators are the three Pauli spin matrices. Similarly, for N=3, the matrix generators are the eight Gell Mann matrices, which are given by $$\lambda_1 = \begin{pmatrix} 0 & 1 & 0 \\ 1 & 0 & 0 \\ 0 & 0 & 0 \end{pmatrix}, \lambda_2 = \begin{pmatrix} 0 & -i & 0 \\ i & 0 & 0 \\ 0 & 0 & 0 \end{pmatrix}, \lambda_3 = \begin{pmatrix} 1 & 0 & 0 \\ 0 & -1 & 0 \\ 0 & 0 & 0 \end{pmatrix},$$

$$\lambda_4 = \begin{pmatrix} 0 & 0 & 1 \\ 0 & 0 & 0 \\ 1 & 0 & 0 \end{pmatrix}, \lambda_5 = \begin{pmatrix} 0 & 0 & -i \\ 0 & 0 & 0 \\ i & 0 & 0 \end{pmatrix},$$

$$\lambda_6 = \begin{pmatrix} 0 & 0 & 0 \\ 0 & 0 & 1 \\ 0 & 1 & 0 \end{pmatrix}, \lambda_7 = \begin{pmatrix} 0 & 0 & 0 \\ 0 & 0 & -i \\ 0 & i & 0 \end{pmatrix}, \lambda_8 = \frac{1}{\sqrt{3}} \begin{pmatrix} 1 & 0 & 0 \\ 0 & 1 & 0 \\ 0 & 0 & -2 \end{pmatrix}.$$

Again, referring to the case where N=2, the generated matrices comprise the Pauli spin matrices. For N=3, the N optical signals comprise first, second, and third signals N1, N2, N3, the generated matrices comprise the Gell-Mann matrices, and T represents a matrix whose elements are composed as follows:

$$T = \begin{pmatrix} s12 \cdot t3 + (3^{1/2} \cdot s123 \cdot t8)/3 & s12 \cdot t1 - (s12 \cdot t2 \cdot i) & s13 \cdot t4 - (s13 \cdot t5 \cdot i) \\ s12 \cdot t1 + (s12 \cdot t2 \cdot i) & (3^{1/2} \cdot s123 \cdot t8)/3 - s12 \cdot t3 & s23 \cdot t6 - (s23 \cdot t7 \cdot i) \\ s13 \cdot t4 + (s13 \cdot t5 \cdot i) & s23 \cdot t6 + (s23 \cdot t7 \cdot i) & -(2 \cdot 3^{1/2} \cdot s123 \cdot t8)/3 \end{pmatrix},$$

where (i) s12 represents a propagation delay difference among common transmission modes within signal N1 and signal N2, (ii) s13 represents a propagation delay difference among common transmission modes within signal N1 and signal N3, (iii) s23 represents a propagation delay difference among common transmission modes within signal N2 and signal N3, and (iv) s123 represents a propagation delay difference among common transmission modes within signal N1, signal N2, and signal N3.

To enable the aforementioned measurements of the propagation delay differences, the launch controller 80 can be configured to comprise a device for selecting the appropriate modes, a means for adjusting the phase relationships and, a partial beam combiner in order to create an interference pattern. In a contemplated embodiment, for the measurements corresponding to Λ1, Λ2, and Λ3, half wave plates are used for the phase adjustments while, for the measurements corresponding to Λ2, Λ5, and Λ7 quarter wave plates are used for the phase adjustments.

For N=4 and above, T can be scaled to include the $N^2-1$ distinct measurement conditions. More specifically, the matrix equation set forth above is valid for arbitrary N. So, the generators for the SU(N) unitary group can be used in place of the Gell Mann matrices used in the case where N=3. The unitary group in n dimensions U(n) is the group of n×n matrices $U_a$ satisfying $$U_a^\dagger = U_a^{-1}$$

where a stands for the parameters of the group, the dagger denotes the Hermitian conjugate matrix, and the superscript −1 denotes the inverse. The special unitary groups SU(N) have matrices with determinants equal to unity. This provides another relation so that SU(N) is characterized by $N^2-1$ parameters. The group SU(n) also has a representation of $N^2-1$ dimensions, the same number as the number of generators of the group. N-dimensional representations of the algebra of SU(N) can be constructed. For N=2, the matrices are the familiar Pauli spin matrices, given by $$\sigma_1 = \begin{pmatrix} 0 & 1 \\ 1 & 0 \end{pmatrix}, \sigma_2 = \begin{pmatrix} 0 & -i \\ i & 0 \end{pmatrix}, \sigma_3 = \begin{pmatrix} 1 & 0 \\ 0 & -1 \end{pmatrix}$$

The N-dimensional generators of SU(N) operate on N-dimensional column vectors. Clearly, there are N linearly independent vectors, which we may denoted as follows for SU(2) and SU(3), where a=1, 2, ... n:

$$u_1 = \begin{pmatrix} 1 \\ 0 \end{pmatrix}, u_2 = \begin{pmatrix} 0 \\ 1 \end{pmatrix}$$

-continued $$u_1 = \begin{pmatrix} 1 \\ 0 \\ 0 \end{pmatrix}, u_2 = \begin{pmatrix} 0 \\ 1 \\ 0 \end{pmatrix}, u_3 = \begin{pmatrix} 0 \\ 0 \\ 1 \end{pmatrix}$$

The N polarizations transform from the system input to the system output according to the equation:

$$ui^* = Uij^* uj$$

where $$U = \exp^{[i\Sigma \gamma ii \lambda i]}$$

In this equation, the sum over i is from i=1 to $N^2-1$. The γi are effectively propagation differences among the transmission modes. The sum to $N^2-1$ rather than N results from the fact that coupling can occur to any polarization or mode within the group and phase differences as well as amplitude differences can exist among the modes. Also, in the same equation, the λi represent the generators of the group, and the γi are effectively propagation delays or time delay differences among the modes. These modes or group of modes arrives with a group time delay that is not relevant because the concern is the difference among the modes. The total delay includes terms accounting for the chromatic dispersion and the waveguide dispersion of the group. As a result, for calculation purposes the average value of the time delays can be subtracted from each delay.

The γi represents the propagation constants terms βi times the length z, which product is proportional the time delays since $$\tau i = 1/c(\delta\beta iz/\delta k)$$

the result of which shows that the time delay differences are the measured variables that are used to mathematically describe the group as it transforms from the fiber input to the fiber output. The principal states at the input are obtained from those at the output by taking the transpose of the matrix. So now one can launch signals into the N principal states at the input and receive these signals without signal deterioration due modal interference.

A suitable data transmission network for implementing the aforementioned methodology is illustrated schematically in FIG. 1 and comprises a launching portion 10, a receiving portion 15, and a multimode optical fiber 60 extending there between. In some embodiments, the multimode optical fiber 60 comprises a few mode fiber and may span a length of at least approximately 100 km. It is contemplated that the multimode fiber may comprise multiple cores or a single core.

The launching portion comprises N independent launch paths for each of N optical signal paths, a mode combiner 50 for superimposing N distinct transmission modes M1, M2, . . . in each of the N optical signal paths, and an additional mode combiner 50 for superimposing N optical signals in the multimode optical fiber 60. The illustrated phase/amplitude controller 40 is configured such that each of the N independent launch paths of the launching portion 10 comprises dedicated phase and amplitude controllers for controlling the phase and amplitude of each of the N distinct transmission modes M1, M2, . . . prior to the superimposition of the N distinct transmission modes M1, M2, . . . by the mode combiner 50.

The receiving portion 15 comprises an optical tap 70 for optically sampling a portion of each of the superimposed N optical signals, a transmission mode splitter embodied in the launch condition controller 80 for splitting the N distinct superimposed transmission modes (M1, M2, . . . ) of the N propagating optical signals into N optical detection channels also embodied in the launch condition controller 80, such that common transmission modes (M1, M2, . . . ) of the N propagating optical signals are transmitted to common ones of the N optical detection channels. The launch condition controller 80 is in communication with the phase/amplitude controller 40.

The launch controller 80 is configured to generate principal state eigenvectors of an output matrix corresponding to the N propagating optical signals at the receiving portion, transpose the output matrix, and generate principal state launch conditions from the eigenvectors of the transposed output matrix. The launch controller is in communication with the respective phase and amplitude controllers of the launching portion for controlling the phase and amplitude of each of the N distinct transmission modes M1, M2, . . . . In this manner, the phase and amplitude of the N distinct superimposed transmission modes M1, M2, . . . of each of the N optical signals can be controlled in accordance with the principal state launch conditions to form respective principal states of polarization in each of the N optical signals.

It is noted that recitations herein of a component of the present disclosure being "programmed" or "configured" in a particular way, to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various inventions described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A method of superimposing N optical transmission modes for collective transmission along a multimode optical fiber, where N>1, and the method comprises:
launching N optical signals for propagation over a data transmission network comprising a multimode optical fiber, wherein each of the N optical signals comprises N distinct superimposed transmission modes (M1, M2, . . . );
optically sampling a portion of each of the N propagating optical signals at a receiving end of the data transmission network;
splitting the N distinct superimposed transmission modes (M1, M2, . . . ) of the N propagating optical signals into N optical detection channels;
deriving $N^2-1$ distinct measurement conditions from a transmission matrix T and a special unitary matrix group SU(N) corresponding to the superimposed transmission modes (M1, M2, . . . ) at the receiving end of the data transmission network;

extracting $N^2-1$ measurements from the sampled signals, wherein the $N^2-1$ measurements correspond to the $N^2-1$ distinct measurement conditions;

using the extracted $N^2-1$ measurements to solve the matrix equation $$(T \cdot \Lambda)|V\rangle = \tau|V\rangle$$

where $\Lambda$ represents generated SU(N) matrices, $\tau$ represents the extracted measurements, and $|V\rangle$ represents principal state eigenvectors of an output matrix corresponding to the N propagating optical signals at the receiving end of the data transmission network;

transposing the output matrix and generating principal state launch conditions from the eigenvectors of the transposed output matrix; and controlling the phase and amplitude of the N distinct superimposed transmission modes (M1, M2, . . . ) of each of the N optical signals in accordance with the principal state launch conditions to form a principal state in each of the N optical signals.

2. A method as claimed in claim 1 wherein the $N^2-1$ measurements are extracted from the sampled signals on a periodic basis.

3. A method as claimed in claim 1 wherein the $N^2-1$ measurements are extracted from the sampled signals in response to a detected condition of the sampled signals.

4. A method as claimed in claim 1 wherein the $N^2-1$ distinct measurement conditions comprise measurements of propagation delay differences among common transmission modes within selected ones of the N optical signals.

5. A method as claimed in claim 4 wherein, for N=2, the generated SU(N) matrices comprise the Pauli spin matrices.

6. A method as claimed in claim 4 wherein:
for N=3, the N optical signals comprise first, second, and third signals N1, N2, N3;
the generated SU(N) matrices comprise the Gell-Mann matrices $$T = \begin{pmatrix} s12 \cdot t3 + (3^{1/2} \cdot s123 \cdot t8)/3 & s12 \cdot t1 - (s12 \cdot t2 \cdot i) & s13 \cdot t4 - (s13 \cdot t5 \cdot i) \\ s12 \cdot t1 + (s12 \cdot t2 \cdot i) & (3^{1/2} \cdot s123 \cdot t8)/3 - s12 \cdot t3 & s23 \cdot t6 - (s23 \cdot t7 \cdot i) \\ s13 \cdot t4 + (s13 \cdot t5 \cdot i) & s23 \cdot t6 + (s23 \cdot t7 \cdot i) & -(2 \cdot 3^{1/2} \cdot s123 \cdot t8)/3 \end{pmatrix};$$

s12 represents a propagation delay difference among common transmission modes within signal N1 and signal N2;
s13 represents a propagation delay difference among common transmission modes within signal N1 and signal N3;
s23 represents a propagation delay difference among common transmission modes within signal N2 and signal N3; and
s123 represents a propagation delay difference among common transmission modes within signal N1, signal N2, and signal N3.

7. A method as claimed in claim 4 wherein, for N=4 and above, T is scaled to include the $N^2-1$ distinct measurement conditions.

8. A method as claimed in claim 1 wherein the transmission modes (M1, M2, . . . ) comprise polarization modes, spatial modes, or a combination thereof.

9. A method as claimed in claim 8 wherein the N distinct superimposed transmission modes (M1, M2, . . . ) within each of the N optical signals comprise a common set of transmission modes such that the polarization modes, spatial modes, or combination thereof, within any selected one of the N optical signals are identical to the transmission modes of the others.

10. A method as claimed in claim 1 wherein N=3 and the N distinct superimposed transmission modes (M1, M2, . . . ) comprise the LP11, LP01, LP02 spatial modes.

11. A method as claimed in claim 1 wherein N≤8 and the N distinct superimposed transmission modes (M1, M2, . . . ) comprise N transmission modes selected from four available polarization modes of the LP11 spatial mode, two available polarization modes of the LP01 spatial mode, and two available polarization modes of the LP02 spatial mode.

12. A method as claimed in claim 1 wherein the N distinct superimposed transmission modes (M1, M2, . . . ) comprise polarization modes selected from the LP11 spatial mode.

13. A method as claimed in claim 12 wherein N=3 and the polarization modes selected from the LP11 spatial mode comprise the HE21, TM01, and TE01 polarization modes.

14. A method as claimed in claim 12 wherein N=4 and all four polarization modes are selected from the LP11 spatial mode as the transmission modes (M1, M2, M3, M4).

15. A method as claimed in claim 1 wherein the multimode optical fiber comprises a few mode fiber.

16. A method as claimed in claim 1 wherein a length of a multimode optical fiber portion of the data transmission network is at least approximately 100 km.

17. A method as claimed in claim 1 wherein the multimode fiber comprises multiple cores or a single core.

18. A data transmission network comprising a launching portion, a receiving portion, and a multimode optical fiber extending there between, wherein:
the launching portion comprises N independent launch paths for each of N optical signal paths, a mode combiner for superimposing N distinct transmission modes (M1, M2, . . . ) in each of the N optical signal paths, and an additional mode combiner for superimposing N optical signals in the multimode optical fiber;

N>1;

each of the N independent launch paths of the launching portion comprises a phase controller and an amplitude controller for controlling phase and amplitude of each of the N distinct transmission modes (M1, M2, . . . ) prior to the superimposition of the N distinct transmission modes (M1, M2, . . . ) by the mode combiner;

the receiving portion comprises an optical tap for optically sampling a portion of each of the superimposed N optical signals, a transmission mode splitter for splitting the N distinct superimposed transmission modes (M1, M2, . . . ) of the N propagating optical signals into N optical detection channels such that common transmission modes (M1, M2, . . . ) of the N propagating optical signals are transmitted to common ones of the N optical detection channels, and a launch condition controller in communication with the launching portion;

the launch controller is configured to generate principal state eigenvectors of an output matrix corresponding to the N propagating optical signals at the receiving portion, transpose the output matrix, and generate principal state launch conditions from the eigenvectors of the transposed output matrix; and the launch controller is in communication with the respective phase and amplitude controllers of the launching portion for controlling phase and amplitude of each of the N distinct transmission modes (M1, M2, . . . ).

* * * * *